F. C. BLANCHARD.
GAGE.
APPLICATION FILED JULY 13, 1910.

978,833.

Patented Dec. 20, 1910.

WITNESSES:
Charles J. Woodberry
Josephine H. Ryan

INVENTOR
Frederick C. Blanchard

UNITED STATES PATENT OFFICE.

FREDERICK C. BLANCHARD, OF BRIDGEPORT, CONNECTICUT, ASSIGNOR TO THE ASHCROFT MANUFACTURING COMPANY, OF BRIDGEPORT, CONNECTICUT, A CORPORATION OF CONNECTICUT.

GAGE.

978,833.  Specification of Letters Patent.  Patented Dec. 20, 1910.

Application filed July 13, 1910. Serial No. 571,709.

*To all whom it may concern:*

Be it known that I, FREDERICK C. BLANCHARD, a citizen of the United States, and resident of Bridgeport, in the county of Fairfield and State of Connecticut, have invented new and useful Improvements in Gages, of which the following is a specification.

My invention relates to gages and more particularly to the provision of a suitable closure or plate for the indicator opening which is commonly provided in the casing for the reading of the gage. It is essential that the closure of the indicator opening be made of a material through which the gage may easily be read at all times, and glass is unquestionably the best material for this purpose. The glass plates however, which have heretofore been provided for closing gage indicator openings, have been firmly held against the wall of the casing, as for example by metal clips and screws, or have been set and firmly held in plaster or like material. Glass plates thus firmly held have proved unsatisfactory in use for the reason that they are easily broken not only in transportation, but also in the many classes of service where the gage is in an exposed position. In the attempt to overcome the difficulties caused by the breakage of glass plates, it has heretofore been proposed to cover the indicator opening with plates of celluloid or mica. Both of these materials however, have proved unsatisfactory in use. Celluloid discolors with age and becomes dark and cloudy thus interfering with the reading of the gage, and mica punctures or stratifies when subjected to a blow so that it becomes very difficult thereafter to read the gage.

It is the object of my invention to provide a closure or plate for the indicator opening which shall be made of the best material for the purpose, namely glass, and secured within the gage casing in such manner as to eliminate or render negligible the breakage heretofore incident to the transportation and use of gages having indicator openings closed with glass plates.

Figure 1:
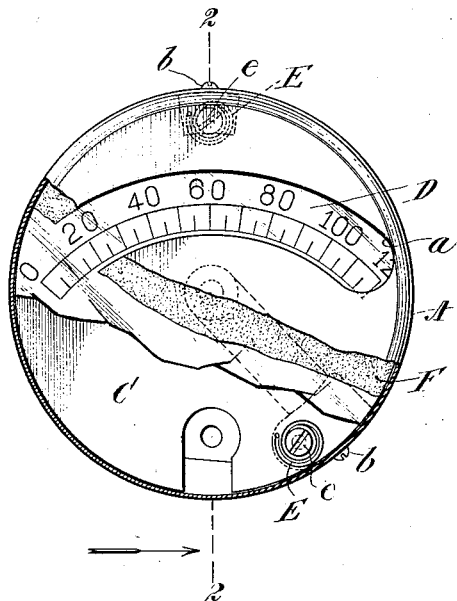
Figure 2:
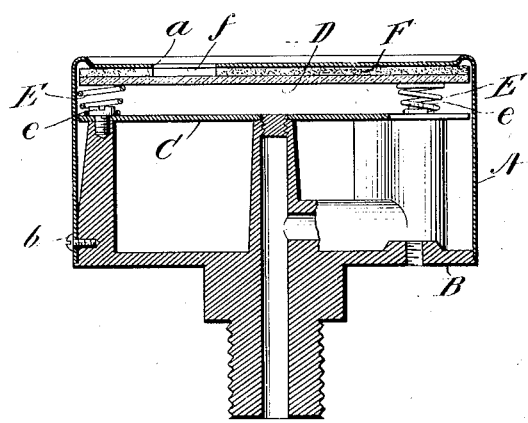

Referring to the drawings illustrating an embodiment of my invention: Figure 1 is a plan view of a gage, the jacket being partly broken away, and Fig. 2 is a sectional view on the line 2—2 Fig. 1.

The gage casing consists essentially of a jacket A, provided with the usual indicator opening *a*, and a base or back B, the former being secured to the latter in any suitable manner as by screws *b*.

C is the gage dial secured within the casing in any suitable manner; and D is the glass plate preferably of circular form and of slightly less diameter than the internal diameter of the jacket. The plate D is yieldingly held against the front wall of the jacket A, which serves as a seat therefor, by springs E mounted on the dial C, and having their lower ends secured thereto in any suitable manner, as by screws *e*.

Under ordinary conditions of use, the springs E hold the plate D against the wall of the jacket sufficiently tight to prevent the entrance of dust or gases into the gage casing. If however, it is found necessary or desirable to seal the joint between the plate D and the edge of the indicator opening *a* more securely, I provide a pad or cushion F between the face of the plate D and the wall of the jacket A. This pad or cushion is preferably made of soft packing material and is provided with an opening *f* of the same shape as the indicator opening *a* with which it is adapted to register. The springs E press the glass plate D tightly against the cushion F, thus sealing the joint between the glass plate and the edge of the opening *a*, and effectively preventing dust, dirt, gases and vapor from entering and injuring the gage.

It will be clear that the purpose of the springs E is to take up or lessen the shock and to permit the glass plate D to move when the gage or the plate itself is subjected to a jar or blow, thus eliminating or rendering negligible the liability of breakage which exists when the plate, as in the constructions heretofore provided, is so firmly held within the jacket that it cannot move when the gage is subjected to rough usage.

A further advantage of my invention resides in the ease with which the glass plate can be replaced if under extraordinary conditions of use it is cracked or broken. In the constructions heretofore provided in which the plate is held by clips or set in plaster or like material, it is difficult to replace the broken plate, the work requiring considerable time and often rendering necessary the employment of skilled workmen and the use of special tools. In my invention on the contrary, a broken plate can readily be replaced by persons unskilled in the making or assembling of gages. All that is required is to unscrew the jacket A from the base B and substitute a new glass plate for the broken one. No fitting or machine work is necessary and the only tool which is needed is a screw driver to remove and replace the jacket screws $b$. This adaptability for easy and quick repair is of real importance as it permits a broken plate to be replaced before any appreciable amount of dust, gases, etc., can enter and injure the gage.

By this construction there is provided a closure or plate for a gage indicator opening which is strong, and simple and which permits the use of the most desirable material with but little or no likelihood of breakage under the usual conditions of transportation and service.

I claim:

In a gage in combination a casing comprising a metal jacket having an indicator opening and a seat for a glass plate, said glass plate, and a cushion between said plate and said seat having an opening of the same form as said indicator opening and adapted to register therewith, a dial and a spring mounted on said dial adapted yieldingly to hold said plate against said cushion.

Signed by me at Bridgeport, Connecticut, this 8th day of July, 1910.

FREDERICK C. BLANCHARD.

Witnesses:
  W. R. CLARKE,
  WM. R. STROUD.